Patented Feb. 2, 1943

2,310,168

UNITED STATES PATENT OFFICE 2,310,168

VITAMIN B6 INTERMEDIATE

Gustaf H. Carlson Pearl River, N. Y., assignor to Lederle Laboratories, Inc., New York, N. Y., a corporation of Delaware No Drawing. Application September 26, 1941, Serial No. 412,428

5 Claims. (Cl. 260—297)

This invention relates to new chemical compounds and more particularly relates to an intermediate for use in the preparation of vitamin B6 and to a process of preparing the same.

The compounds made in accordance with the present invention may be represented by the following formula:

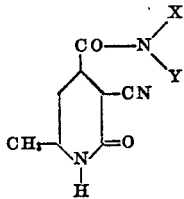

in which X and Y represent hydrogen or an alkyl, aryl, aralkyl, or cycloaliphatic radical.

The invention will be illustrated in more detail in conjunction with the following specific example.

*Preparation of the amide of 3-cyano-4-carboxy-6-methyl pyridone-2*

Two hundred grams of the ethyl ester of 3-cyano-4-carboxy-6-methyl pyridone-2 (prepared according to the method described by Bardhan, J. C. S., 2223 (1929)) were added to 3.5 liters of absolute methanol saturated at 0° C. with gaseous ammonia and, after 7 days at 0° C., the filtered solution was concentrated in vacuo to a small volume to give the amide of 3-cyano-4-carboxy-6-methyl pyridone-2, which melted above 300° C. with decomposition. The compound so prepared is useful as an intermediate in the synthesis of vitamin B6.

The reaction which takes place may be represented by the following equation:

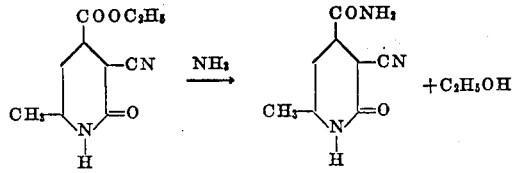

In the foregoing specific example the ethyl ester of 3-cyano-4-carboxy-6-methyl pyridone-2 was employed in carrying out the reaction and is the preferred ester because of its cheapness and availability. It should be understood, however, that the ethyl ester may be replaced by other suitable esters of 3-cyano-4-carboxy-6-methyl pyridone-2. Among the various esters that may be employed are the alkyl esters such as methyl, propyl, butyl, amyl, hexyl, and the like. The aromatic esters, such as phenyl and naphthyl, may similarly be employed. Esters of the aralkyl type which may be satisfactory are those such as the benzyl ester and the ester of 2-hydroxymethylnaphthalene, cinnamyl alcohol, etc. The esters derived from cycloaliphatic alcohols such as cyclohexanol, methyl cyclohexanol, fenchol or fenchyl alcohol, and the like, may be employed. The use of the various other esters such as those derived from heterocyclic alcohols, for example furfuryl alcohol, tetrahydrofurfuryl alcohol, or those derived from nitro alcohols such as 2-nitro-2-methyl-1-propanol are not precluded from the present invention.

Various primary and secondary amine derivatives of 3-cyano-4-carboxyl-6-methyl pyridone-2 may be prepared by the process of my invention when ammonia is replaced by a suitable primary or secondary amine. The primary or secondary amine derivatives of 3-cyano-4-carboxy-6-methyl pyridone-2 may be prepared by methods similar to that employed in producing the amide. In carrying out my invention I prefer to use gaseous ammonia. Among those which may be satisfactory are ethyl amine, butyl amine, allyl amine, aniline, benzyl amine, diethyl amine, dibutyl amine, dibenzyl amine, and the like.

I claim:

1. The process of producing compounds represented by the following general formula:

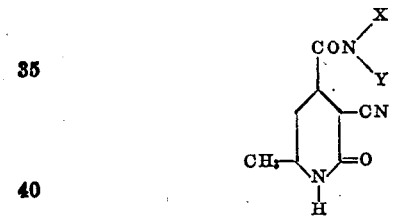

in which X and Y are members of the group consisting of hydrogen, alkyl, aryl, aralkyl, and cycloaliphatic radicals, which comprises reacting an ester of 3-cyano-4-carboxy-6-methyl pyridone-2 with a member of the group consisting of ammonia, primary amines and secondary amines.

2. The process which comprises reacting an ester of 3-cyano-4-carboxy-6-methyl pyridone-2 with ammonia to produce the amide of 3-cyano-4-carboxy-6-methyl pyridone-2.

3. The process which comprises reacting the ethyl ester of 3-cyano-4-carboxy-6-methyl pyridone-2 with ammonia to produce the amide of 3-cyano-4-carboxy-6-methyl pyridone-2.
4. The compounds of the formula:
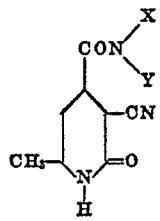
in which X and Y are members of the group consisting of hydrogen, alkyl, aryl, aralkyl, and cycloaliphatic radicals.
5. The compound of the formula:
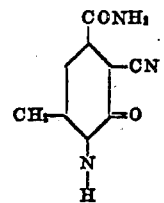
GUSTAF H. CARLSON.